(12) United States Patent
Kozko (10) Patent No.: US 9,521,321 B1
(45) Date of Patent: *Dec. 13, 2016

(54) ENABLING MANUALLY TRIGGERED MULTIPLE FIELD OF VIEW IMAGE CAPTURE WITHIN A SURROUND IMAGE MODE FOR MULTI-LENS MOBILE DEVICES

(71) Applicant: Dmitry Kozko, Aventura, FL (US)

(72) Inventor: Dmitry Kozko, Aventura, FL (US)

(73) Assignee: 360 LAB LLC., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/671,261

(22) Filed: Mar. 27, 2015

Related U.S. Application Data

(63) Continuation-in-part of application No. 14/619,724, filed on Feb. 11, 2015, now Pat. No. 9,374,529, and a continuation-in-part of application No. 14/619,777, filed on Feb. 11, 2015, now Pat. No. 9,380,207.

(60) Provisional application No. 62/128,735, filed on Mar. 5, 2015.

(51) Int. Cl.
*H04N 5/225* (2006.01)
*H04N 5/232* (2006.01)

(52) U.S. Cl.
CPC ........ *H04N 5/23238* (2013.01); *H04N 5/2258* (2013.01); *H04N 5/23216* (2013.01); *H04N 5/23296* (2013.01)

(58) Field of Classification Search
None
See application file for complete search history.

(56) References Cited

U.S. PATENT DOCUMENTS

| | | | | |
|---|---|---|---|---|
| 8,730,299 B1 * | 5/2014 | Kozko | ................. | H04N 5/2254 348/38 |
| 2012/0206565 A1 * | 8/2012 | Villmer | .................... | H04N 1/00 348/36 |
| 2013/0120602 A1 * | 5/2013 | Huang | .............. | H04M 1/72522 348/218.1 |

* cited by examiner

*Primary Examiner* — Andy Rao
*Assistant Examiner* — Tyler Edwards
(74) *Attorney, Agent, or Firm* — Patents on Demand P.A.; Brian K. Buchheit; Scott M. Garrett (57) ABSTRACT

A user activation of an image capture function of a mobile device is received. The image capture function is for a surround image mode. Two or more camera lenses are approximately concurrently activated. A front-side image from a first camera lens and a rear-side image from a second camera lens can be optically captured. A second front-side image from the first camera lens and a second rear-side image from the second camera lens can be optically captured responsive to a manual pan/tilt/zoom operation of the front-side or rear-side lense. Content from the front-side images and content from the rear-side images are recorded in a non-transitory storage medium of the mobile device within a single file for a surround mode image.

16 Claims, 9 Drawing Sheets

ABSTRACT

ENABLING MANUALLY TRIGGERED MULTIPLE FIELD OF VIEW IMAGE CAPTURE WITHIN A SURROUND IMAGE MODE FOR MULTI-LENS MOBILE DEVICES

CROSS-REFERENCE TO RELATED APPLICATIONS

This application is a continuation in part of pending application Ser. No. 14/619,724, filed Feb. 11, 2015 and pending application Ser. No. 14/619,777, filed Feb. 11, 2015, both of which claim priority to application Ser. No. 14/282,468, application Ser. No. 14/280,071 application Ser. No. 14/092,393, and U.S. Pat. No. 8,730,299. Priority is also claimed to provisional application Ser. No. 62/128,735, filed Mar. 6, 2015. Each of the applications listed above are incorporated by reference herein in their entirety.

BACKGROUND

The present invention relates to the field of imaging and, more particularly, to a enabling manually triggered multiple field of view image capture within a surround image mode for multi-lens mobile devices.

Increasingly, camera equipped mobile devices like smart phones and tablets are replacing formerly discrete devices, such as still and video cameras. Consumers have begun to demand additional functionality from these devices (or from digital cameras). For example, cameras able to record depth for 3D and 4D imagining have begun to emerge. Similarly, panoramic modes for image capture are becoming an increasingly popular feature of many modern mobile device operating systems.

Conventional panoramic capture modes require successive movements of a device with a single activated lens. The movement permits different fields of view to be captured at different points in time, which can be stitched together into a panoramic view. Using conventional techniques, capturing scenes in this manner can be time consuming, and dynamic movement within the scenes (causing discrepancies in the time spaced images) can be problematic.

Another conventional panoramic technique is to utilize a single ultra-wide angle lens to capture a panoramic scene. This ultra-wide angle lenses may result in significant distortion, but the convenience of capturing a scene without time spacing images, outweighs these negatives to many users and manufactures. Some panoramic lenses are optical peripherals attachable to a mobile device, such as a smartphone) to bend incoming light (using a fish-eye lens for example) before it enters the camera's internal optical components.

The present disclosure details innovations permitting a surround image mode from a mobile device, which provides advantages of the techniques above with fewer associated negative tradeoffs.

DETAILED DESCRIPTION

The present disclosure is a solution for enabling manually triggered multiple field of view image capture within a surround image mode for multi-lens mobile devices. In the solution, a panoramic camera can include one or more wide angle lens, ultra wide angle lens, and the like. In one embodiment, the panoramic camera can include a front and rear facing lens which can capture an aggregate field of view of 180 degrees or greater. In one instance, the panoramic camera of the case can be triggered in response to a manual action performed by a user when the camera is in surround mode. In the instance, the front and rear facing lenses can be manually actuated (e.g., repositioned by a user) to capture two or more images with differing fields of view (e.g., two 90 degree field of view images for the front lens). In the instance, the sum of the fields of view for the images for each side (e.g., front, rear) can meet or exceed 180 degrees. In one embodiment, the images can be stitched together to form a 360 degree panorama.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1A:
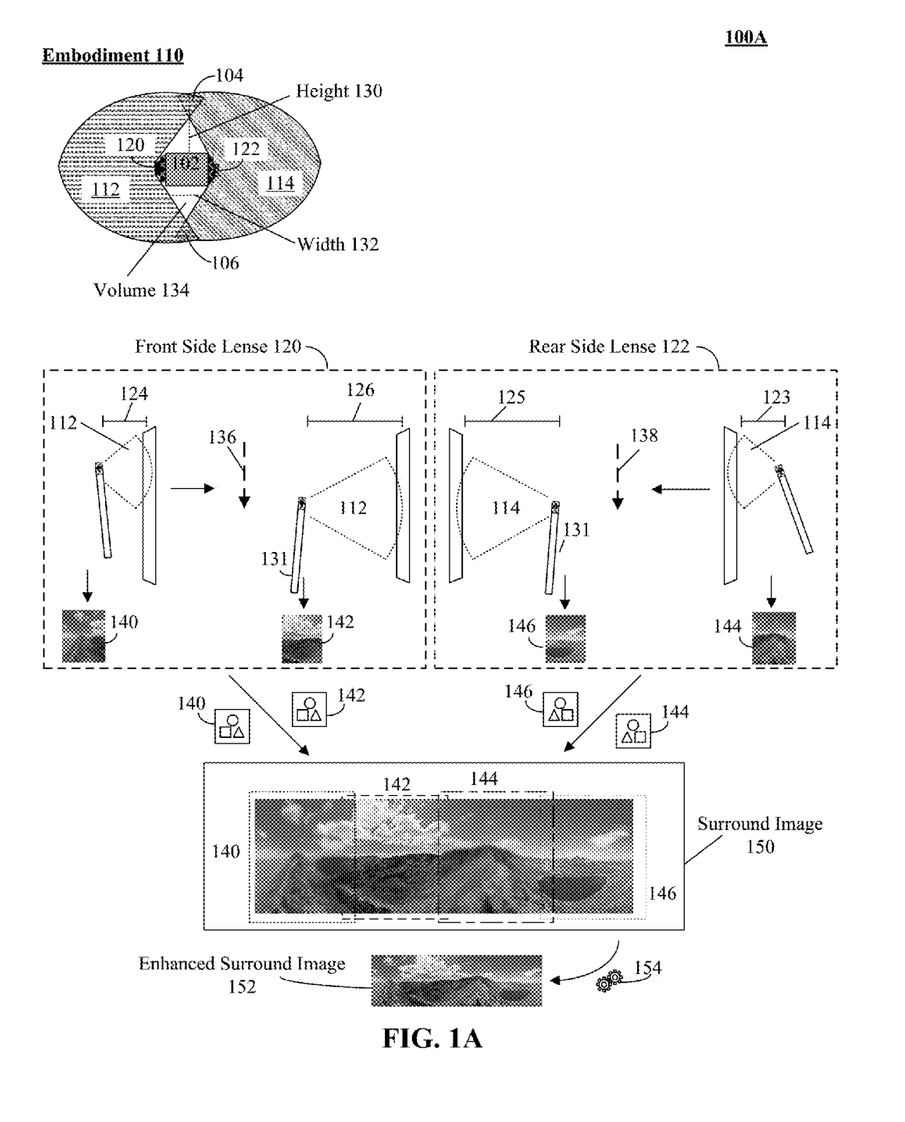
FIG. 1A-B is a schematic diagram illustrating a set of embodiments for enabling manually triggered multiple field of view image capture within a surround image mode for multi-lens mobile devices.

Referring to FIG. 1, a panoramic optical device 102 is shown that has two fixed and substantially opposing lens 120, 122 in accordance with an embodiment of the disclosure. Lens 120 and 122 each can be an ultra-wide lens able to capture a field of view (FOV) (e.g., FOV 112, 114) of greater than 180 degrees. It should be appreciated that field of view can include non-ultra-wide angle fields of view (e.g., embodiment 710) associated with wide angle optics, telescopic optics, and the like. An area of overlap (shown as cross sectional area 104 and 106) can exist for the lenses 120, 122. The cross sectional areas 104, 106 may be slightly different, as while the lenses 120, 124 face in substantially opposing directions, some variance (e.g., +/−five degrees) from opposing direction exists in contemplated embodiments.

A conical volume 134 with a height 130 and a width 132 about the panoramic optical device 102 can be omitted (e.g., not covered) by lens 120 or by lens 122, and is therefore a known "blind spot." Other than this blind spot, a full three hundred and sixty horizontal FOV and a full three hundred and sixty vertical FOV can be be achieved in embodiments of the panoramic optical device 102 using two fixed lenses 120, 122. The body of the optical device 120 is shaped to approximately (within twenty five percent by body volume in one embodiment) fall within volume 134. The body of the optical device 120 therefore minimally blocks or to not block FOV 112 or FOV 114.

It should be appreciated that the camera 102 is not limited to this arrangement and can conform to various configurations and/or implementations (e.g., FIG. 5A-H, 6A-J, 8A-D).

In embodiment 110, a front-side lens 120 and a rear-side lens 122 can be integrated within an electronic device (e.g., camera 102, smart phone). In the embodiment 110, a front-side lens 120 can capture an image 140 and a subsequent image 142 at two different focal distances 124, 126. In one instance, lens 120 can record an image 140 at a focal distance 124 (e.g., focal plane) of five feet and can be manually triggered responsive to a user operation 136 (e.g., pan/tilt/zoom) to capture a subsequent image 142 at a different focal distance 126 (e.g., focal plane) of twenty feet. Image 140 can include a field of view (FoV) 112 (e.g., focal distance 124) and image 142 can include a field of view 112 (e.g., focal distance 124).

In the embodiment 110, a rear-side lens 120 can capture an image 144 and a subsequent image 146 at two different focal distances 123, 125. In one instance, lens 122 can record an image 144 at a focal distance 123 (e.g., focal plane) of five feet and can be manually triggered responsive to a user operation 138 (e.g., pan/tilt/zoom) to capture a subsequent image 146 at a different focal distance 125 (e.g., focal plane) of twenty feet. Image 144 can include a field of view (FoV) 114 (e.g., focal distance 124) and image 146 can include a field of view 114 (e.g., focal distance 124).

In one embodiment, operation 136, 138 can include manually moving the lens 120, 122. In the embodiment, operation 136, 138 can include, but is not limited to, a manual pan operation, a manual tilt operation, and a manual zoom operation. For example, when a user holding a mobile phone with camera 102 flicks their wrist, the movement can be detected and image 140, 142 can be captured. That is, when acceleration is detected, an image 140, 146 can be captured and when the acceleration is halted, an image 142, 144 can be captured. Operation 136, 138 can include panning a camera 102 lens 120, 122 by moving the lens 120, 122 from a start position to a different position by user hand 131, panning camera 102 body by hand (e.g., on a tripod mount), and the like. Operation 136, 138 can include changing focus distance by manually adjusting a zoom ring. Operation 136, 138 can include tilting a camera 102 lens 120, 122 vertically and/or horizontally, tilting camera 102 body by hand (e.g., on a tripod mount).

In one instance, FoV 112, 114 can overlap resulting in four images 140, 142, 144, 146 with overlapping fields of view. In the instance, an image stitching algorithm can stitch the images 140, 142, 144, 146 into a surround image 150 (e.g., 360 degree panoramic). For example, image 140, 142 can include overlapping fields of view (e.g., two 130 degree fields of view) and image 144, 146 can include overlapping fields of view (e.g., two 130 degree fields of view) which can be stitched together to form a 360 degree panorama which can be presented within an interface of a tablet computing device. It should be appreciated that a 360 degree panoramic image (e.g., surround image 150) having multiple focal depths can be generated from images 140, 142, 144, 146.

In one instance, the embodiment 110 can be a stepwise process which can be triggered responsive to an image capture functionality. In the instance, the lens 120 can capture a first image (e.g., 140) and capture a second image (e.g., 142) when the user manually pans the lens 120. In one configuration, an interface can enable this multiple image capture process. In the configuration, the interface can permit subsequent image capture via selection of interface elements. For example, when a user selects a "Ready" push button a first image can be captured and after manually turning the lens with their hand 131 to the right a subsequent image can be captured.

In one embodiment, images 140, 142, 144, 146 can be combined into an enhanced surround image 152 via image processing 154. In the embodiment, image processing can utilize different focal distances 124, 126, 123, 125 of images 140, 142, 144, 146 to improve the clarity (e.g., sharpness, depth of field) of image 150. For example, enhanced surround image 152 can have an average focal distance and depth of field of the combined images which can exceed the detail (e.g., shadows, blacks, contrast) of the surround image 150.

Figure 1B:
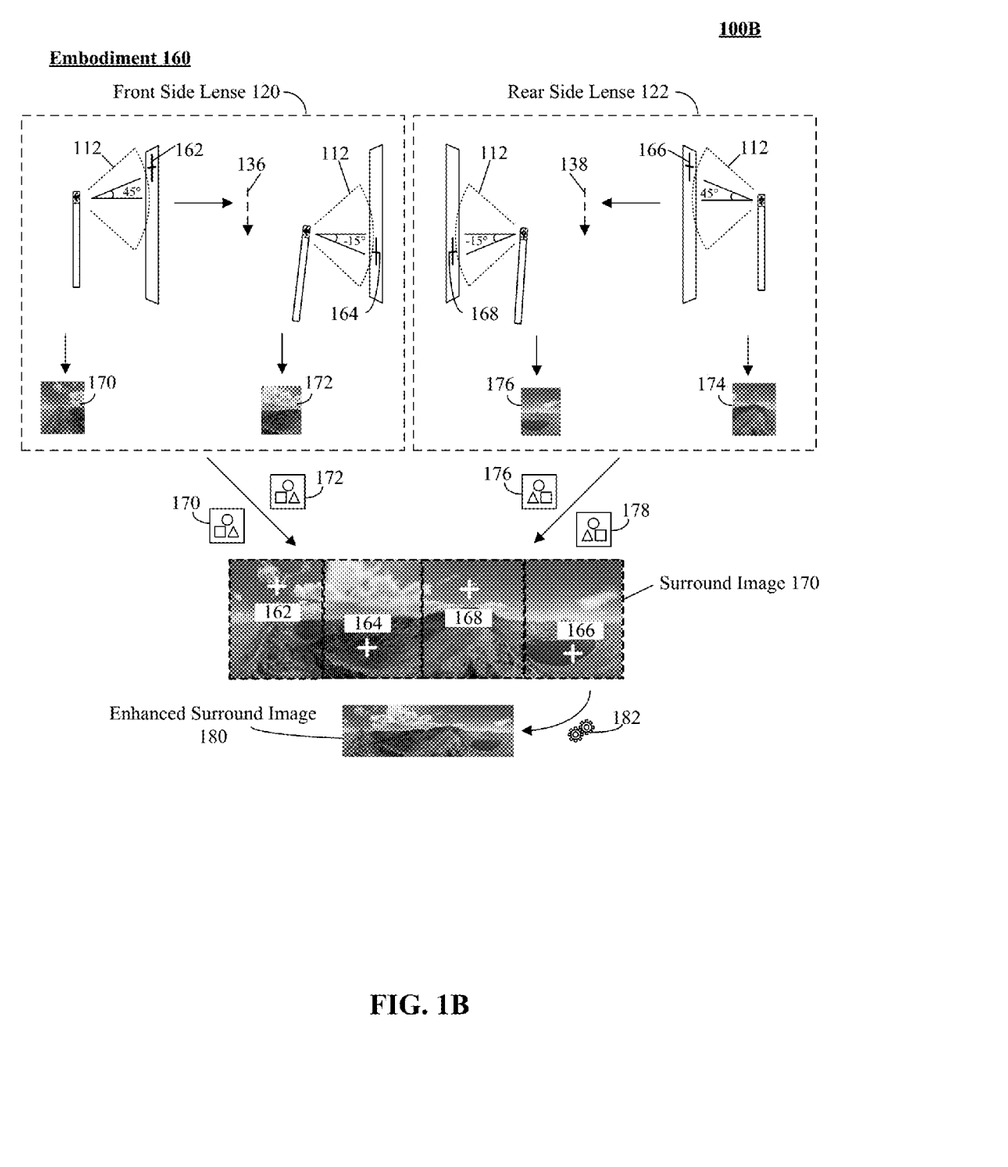

In the embodiment 160, a front-side lens 120 can capture an image 170 and a subsequent image 172 at two different focal angles 162, 164. In one instance, lens 120 can record an image 170 at a focal angle 162 (e.g., focal plane) of twenty five degrees from the center frame focus point and can be manually triggered responsive to a user operation 136 (e.g., pan/tilt/zoom) to capture a subsequent image 172 at a different focal angle 172 (e.g., focal plane) of fifty degrees from the center frame focus point. Image 170 can include a field of view (FoV) 112 (e.g., focal angle 162) and image 172 can include a field of view 112 (e.g., focal angle 164).

In the embodiment 160, a rear-side lens 122 can capture an image 174 and a subsequent image 176 at two different focal angles 166, 168. In one instance, lens 122 can record an image 174 at a focal angle 166 (e.g., focal plane) of twenty five degrees from the center frame focus point and can be manually triggered responsive to a user operation 138 (e.g., pan/tilt/zoom) to capture a subsequent image 176 at a different focal angle 168 (e.g., focal plane) of fifty degrees from the center frame focus point. Image 174 can include a field of view (FoV) 114 (e.g., focal angle 166) and image 176 can include a field of view 114 (e.g., focal angle 176). It should be appreciated that the focal angle of embodiment 160 can be arbitrary.

In one instance, FoV 112, 114 can overlap resulting in four images 170, 172, 174, 176 with overlapping fields of view. In the instance, an image stitching algorithm can stitch the images 170, 172, 174, 176 into a surround image 170 (e.g., 360 degree panoramic). For example, image 170, 172 can include overlapping fields of view (e.g., two 100 degree fields of view) and image 174, 176 can include overlapping fields of view (e.g., two 100 degree fields of view) which can be stitched together to form a 360 degree panorama which can be presented within an interface of a mobile phone. It should be appreciated that a 360 degree panoramic image (e.g., surround image 170) having multiple focal angles can be generated from images 170, 172, 174, 176.

In one embodiment, images 170, 172, 174, 176 can be combined into an enhanced surround image 180 via image processing 182. In the embodiment, image processing can utilize different focal distances 162, 164, 166, 168 of images 170, 172, 174, 176 to improve the clarity (e.g., sharpness, depth of field) of image 170. For example, enhanced surround image 180 can have an average focal distance and depth of field of the combined images which can exceed the detail (e.g., shadows, blacks, contrast) of the surround image 170.

Drawings presented herein are for illustrative purposes only and should not be construed to limit the invention in any regard. It should be appreciated that manual movement of lens 120, 122 can be detected via an accelerometer, contact circuitry, and the like. It should be appreciated that the disclosure is not limited to two images per side (e.g., lens 120, 122) and can be support multiple image capture (e.g., per side) similar to traditional stitched panoramic capture. It should be appreciated that the image capture of the disclosure can conform to any traditional and/or proprietary image capture techniques.

Figures 2A, 2B:
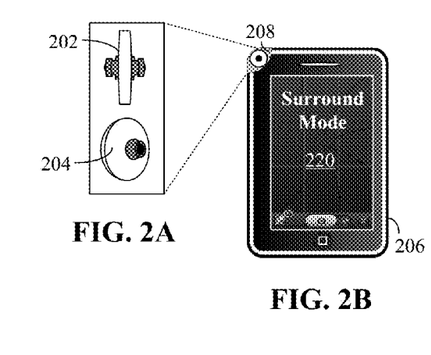
FIGS. 2A, 2B, 2C, and 2D illustrates an enabling manually triggered multiple field of view image capture within a surround image mode for multi-lens mobile devices mobile devices surround image capture mode for a mobile device 106 in accordance with embodiments of the disclosure.
Figure 2C:
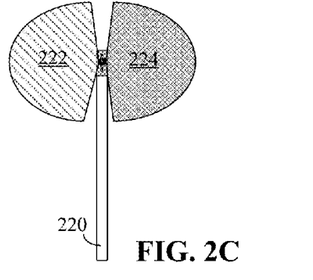
Figure 2D:
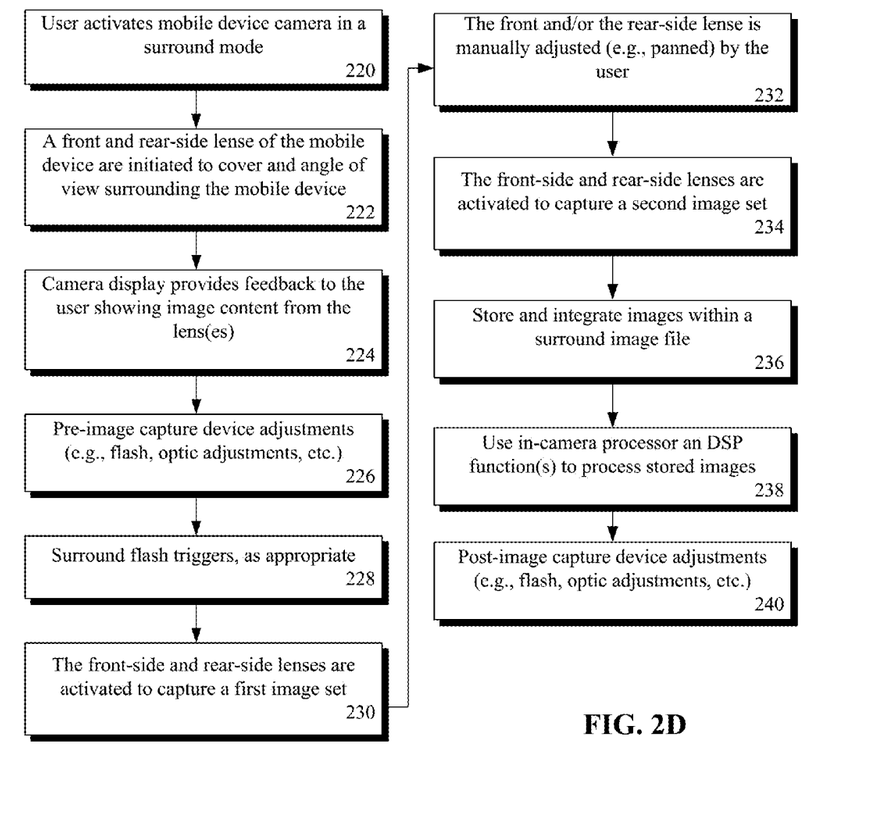

FIGS. 2A, 2B, 2C, and 2D show a surround image capture mode 220 for a mobile device 206 in accordance with embodiments of the disclosure. FIG. 2A shows a view of image components of the mobile device 206. FIG. 2B shows a front view of the mobile device 206. FIG. 2C shows a side view 220 of the mobile device 206. FIG. 2D shows a flow chart of a process for image capture from a mobile device placed in a surround mode.

As seen from side-view (FIG. 2C) of the mobile device 206, the surround image mode represents that images and/or video are captured from opposing sides of a mobile device 206. Thus, a lens on one side of the mobile device captures a front-side field of view 222 while a lens from an opposing side of the mobile device captures a back-side field of view 224. The mobile device 206 may have two or more lenses that are each concurrently activated for the surround image mode. For instance, a "side" lens may be utilized in a three camera embodiment, which has a field of view (not shown) between front-side view 222 and back-side view 224. In a two-lens embodiment, each of the lenses may be ultra-wide angle lenses, which provide a field of view between one hundred and twenty and one hundred and eighty degrees.

As seen from FIG. 2A, the image components may be integrated together an electronic circuit. The electronic circuit's substrate can include two or more lenses facing in opposing directions of the substrate, as shown by side view 202 and angled view 204. Unlike conventional mobile device optic systems, the field of views captured by image components may require a line-of-sight to penetrate a side of the device 206. Thus, in one embodiment, the image component may be placed at a corner of a device with a transparent outer casing, as shown by view 208.

As seen from FIG. 2B, a significant portion of a front face of the mobile device 206 can be occupied by a touch display. A user interface can be presented on this touch display. The user interface can include a special camera/video mode. The user interface for the surround image mode can be integrated into the operating system of the device 206 or can be part of an elective application running on the device 206.

In operation, referring to FIG. 2D, a user may activate a mobile device camera function in a surround image mode, as shown by step 220. In step 222, a front and rear-side lens of the mobile device are initiated to cover an area on both side of the mobile device. Initiating the lenses can take them from a minimal (or no power) state to an active one. In surround image mode, the total captured area of the multiple lenses (see FIG. 2C) can be greater than one hundred and eighty degrees and may or may not be a continuous overlapping capture area.

In step 224, a display of the camera may provide feedback to a user showing image content from one or more lenses. The feedback can be displayed, for example, on a user interface shown on a touch screen (see FIG. 2B). In step 226, a set of pre-image capture device adjustments can occur. These adjustments may include focusing the lense, zooming the lense, repositioning and/or powering up a flash component (e.g., charging the capacitor), and the like. In step 228, a specialized flash (referred to as a surround flash) can be triggered as necessary/appropriate before image(s) are captured. The surround flash may illuminate an environment on both sides of a mobile device.

In step 230, the front and rear-lenses can be active to capture a first image set (e.g., an image from the front-side lens and an image from the rear-side lense). This image capture can occurs (from the multiple lenses) at approximately or substantially the same time. In step 232, the front and/or rear-side lens can be manually adjusted (e.g., panned) by the user. For example, the user can move the front and/or rear-side lens from left to right after the first image set is captured. In step 234, the front and rear-side lenses can be activated to capture a second image set (e.g., an image from the front-side lens and an image from the rear-side lense). It should be appreciated that the first and second image sets can correspond to different fields of view, have different focal distances, focal angles, exposure settings, and the like. In step 236, the images that were captured are stored in a storage medium and integrated within a single surround image file. Alternatively, a folder (referred to as a surround image folder) including multiple images from different lenses may be created. Additionally, both a surround image file and surround image folder may be used in embodiments (i.e., the surround image folder stores a set of lense-specific raw images and the surround image file is created from these raw images).

The camera of the mobile device may or may not take a series of time spaced images when surround mode is activated. This novel function is an extension of conventional panoramic functions, where a single lens is used to create a panoramic image by moving the device or lens to create a capture region greater than otherwise possible. In step 238, an in-camera processor (or a remote one assuming the raw images are conveyed over a network to a remote server) may use one or more internal digital signal processing (DSP) function(s) to process stored images. In step 240, a set of post-image capture device adjustments may occur. These adjustments can change the power state of optic components, of a flash, may adjust the user interface, and the like.

Figure 3:
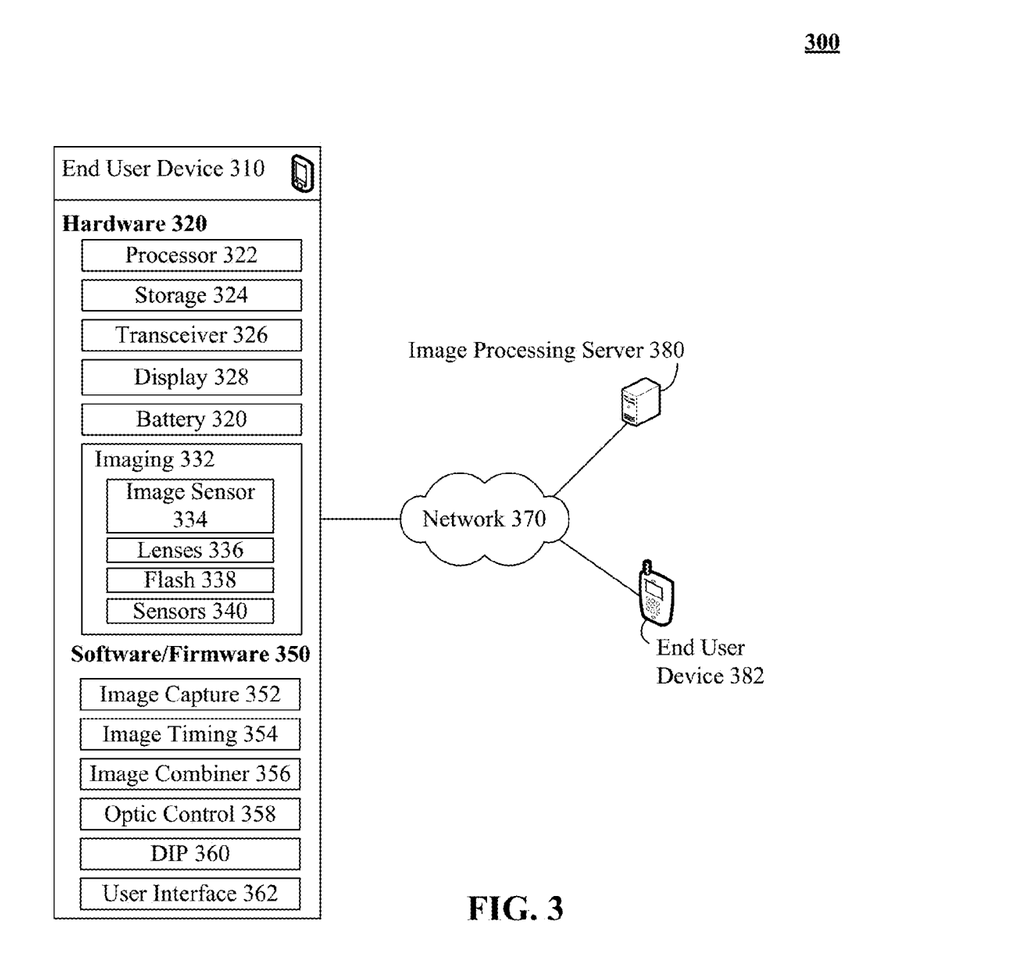
FIG. 3 illustrates a system in which an end user device having surround image mode capability in accordance with embodiments of the disclosure.

FIG. 3 shows a system 300 in which an end user device 310 (such as mobile device 206) having surround image mode capability in accordance with embodiments of the disclosure. The end user device 310 may be a stand-alone device, where all the surround mode imagery functionality is implemented internal to the end user device 310. In another embodiment, the end user device 310 may be a network 370 connected one, where one or more of the surround mode imagery functions are performed remotely, such as by an image processing server 380. End user device 310 may be a mobile communication device able facilitating user communications with one or more remote end-user devices 382. These communications can include the transmission and exchange of surround mode images. For example, end user device may use text messaging (with attachment), video conferencing (streaming video/images captured from imaging component 332), email image conveyances, image file synchronization sharing, and other technologies to provide end user device 382 with imagery from imaging component 332.

End user device 310 may be a smart phone, a tablet computer, smart glasses, a media player, a digital camera, a smart watch, a notebook computer, a mobile gaming device, an e-book reader, and other forms of consumer electronic devices, per different contemplated embodiments. End user device 310 includes hardware 320 and software/firmware 350. Not all the elements shown in the hardware 320 and software/firmware 350 need be present for each implementation of the disclosure, and some implementations will include additional (not shown) components.

End user device includes hardware 320 and software/firmware 350. The hardware 320 includes one or more processors 322, a storage medium 324, a transceiver 326, a display 328, a battery 330 (or other power source), imaging components 332, and the like. The processor 322 can be a central processing unit (CPU) or a microprocessor. Processor 322 carries out instructions of a computer program by performing arithmetical, logical, and input/output operations of a system. The processor 322 can be a single core or multi-core processor.

Storage medium 324 can be a non-transitory storage medium, which refers to a medium that is not a carrier wave. Storage medium 324 stores or records information. Storage medium 324 can use magnetic storage, optical storage, electrical storage technologies, and the like.

Transceiver 326 is a component able to transmit and receive information to and from the end user device 310. Transceiver 326 communicatively links device 310 to network 370, where the communication link may be a wired or wireless link.

Battery 330 is a power source that provides electronic energy to electronics of the end user device 310. The battery 330 is often a chemical battery consisting of one or more electrochemical cells that convert stored chemical energy into electrical energy. Battery 330 may be rechargeable.

Imaging components 332 are components able to capture images and store those images onto storage medium 324. In one embodiment, the imaging components 332 are digital ones, which include image sensor 334, lenses 336, flash 338, sensors 340, and the like. The image sensors, typically charge-coupled device (CCD) or complementary metal-oxide-semiconductor (CMOS) sensor chips, turn light into discrete signals.

The lenses 336 each represent an optical lens or assembly of lenses used to make images of object for storage on storage medium 324. Each lens 336 has a set of fundamental parameters associated, which include focal length and aperture. Each lens 336 may also be associated with image stabilizing components and pixel density. Lenses (336) are often classified as normal lenses, wide-angle lenses, ultra-wide angle, long focus lense, telephoto lens any of which may be part of imaging components 332. Further, zero or more of a set of lenses (336) of the imaging component 332 may be special purpose leases, such as an apochromatic (APO) lense, a process lense, an enlarger lense, a fisheye lense, a stereoscopic lense, a soft focus lense, an infrared lense, an ultraviolent lense, a swivel lense, or a perspective control lense. In one embodiment, lens 336 can be a moveable lens which can be manually moved via a user's hand.

The flash 338 is a component that produces a flash of artificial light (typically for $1/1000$ to $1/200$ of a second) at a color temperature of about 5500 K to help illuminate a scene. The flash 338 may include a high capacity capacitor chargeable to several hundred volts. Flash 338 can be an air-gap flash, a multi flash component (using multiple flashes to find depth edges or to create a stylized image), a high-current flash LED and the like. In one embodiment, the flash 338 can be an omnidirectional one, which illuminates a front and a back side of the camera (thus permitting front and rear lenses to capture an illuminated scene). The flash may be stationary relative to the device 310, or may expend and retract within a body of the device 310. In one embodiment, the flash 338 may be an assembly of two or more discrete components, such as a front facing flash and a rear facing flash.

The sensors 340 include any of a variety of sensors used in photography. These sensors 340 can, for example, detect movement of the device 310, which is especially useful when taking time-spaced images. Sensors 340 may include an accelerometer, a tilt sensor, a gyroscope, a global positioning system (GPS) element, a compass, a barometer, an altimeter, and the like.

The software/firmware 350 may include one or more of an image capture module 352, an image timing module 354, an image combiner 356, an optic control module 358, a digital imaging processor (DIP) module 360, a user interface module 362, and the like.

The image capture module 352 may capture images from multiple lenses facing substantially different directions. For example, the software/firmware of module 352 may capture images substantially concurrently from a front facing camera lens and a rear facing camera lens of a mobile device. In one instance, module 352 can be triggered when a user manually moves a lens 336 from a starting position.

The image timing module 354 module controls a timing of images from multiple different lense(es) 336. In one embodiment, the image timing module 354 can synchronize image capture times from a front facing lens and from a rear facing lense. Video from multiple different (and differently facing) lenses can also be timed. In one embodiment, the timing can be intentionally staggered and/or unified with a sensor (such as a tilt sensor or accelerometer) to take pictures after the device 310 have moved so that the lense(es) 336 cover a different field of view than what is covered in an initial image capture. Super-pixilation (from multiple different images at different times with slightly different angles) can be achieved in one embodiment, by suitable adjustments of the image timing module 354.

The image combiner 356 module combines content from multiple different lenses. The combiner 356 can stitch together images with common or overlapping regions. The image combiner 356 can create images including depth (3D and 4D images), in contemplated embodiments. The image combiner 356 may adjust lighting, contrast, and other image characteristics to optimize them, by combining images taken from different lense(se) 336.

The optic control module 358 controls optical components of the system. Focus, focal length, zoom, flash, angle, and the like are all able to be controlled by program instructions of the optic control module 358 being executed by processor 322.

The digital imaging processor (DIP) module 360 uses computer algorithms to perform image processing on digital images. The DIP module 360 can perform utilize technologies for pixilation, linear filtering, principal components analysis, independent component analysis, Hidden Markov models, anisotropic diffusion, partial differential equations, self-organizing maps, neural networks, wavelets, and the like. Additional DIP processing may occur in image processing server 380 in one embodiment.

User interface 362 can be a human-to-machine interface for the end user device 310. The user interface may interact through a touch screen display (328), to a set of one or more physical buttons that may exist within the hardware 320, to wirelessly connected peripherals that receive user input and/or produce output, and the like. The user interface 362 permits the user to take pictures, video, and sound recordings using the end user device 310. The user interface 362 also permits control of hardware/software functions related to imagery and to establish and change user configuration preferences.

FIG. 4A-4E show different arrangements for positioning camera lenses on a mobile device for enabling surround image mode as detailed herein.

Figure 4A:
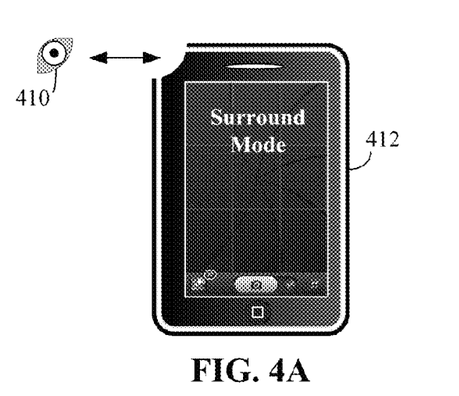
FIG. 4A-4E illustrates different arrangements for positioning camera lenses on a mobile device for enabling surround image mode as detailed herein.

FIG. 4A shows an end-user detachable corner segment 410 for the device 412, where the corner segment includes the imaging components 332. An interface (e.g., ports) can electrically connect corner segment 410 to the device 412. The corner segment 410 can include one or more lenses, which face in different directions. In one embodiment, a set of different corner segments 410, with different internal components and image capture/processing capabilities, can be interchangeably utilized. In this manner, a user can equip a "special purpose" imaging segment into a mobile device, can upgrade imaging functionality without having to replace the entire mobile device, and the like.

Figure 4B:
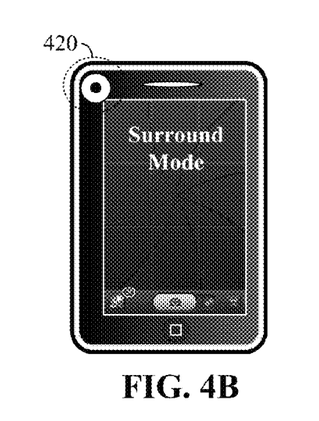
Figure 4C:
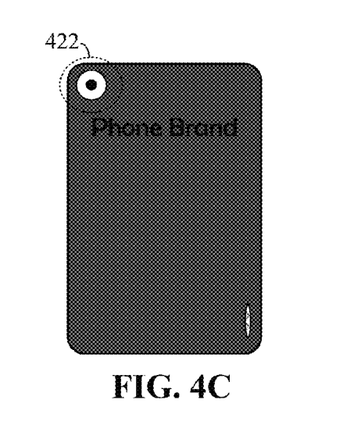

FIGS. 4B and 4C together show imaging components 420 and 422 being positioned in a common corner of a mobile device. The components 420 and 422 may not be removable (as they are in FIG. 4A), but a corner of a printed circuit board is reserved for the imaging components, which include lenses facing in opposing directions. Using this standard, a common corner component can be easily added to a variety of mobile devices at a manufacture's fabrication facilities. Optics 420 can include one or more front facing lenses. Optics 422 can include one or more rear facing lenses.

Figure 4D:
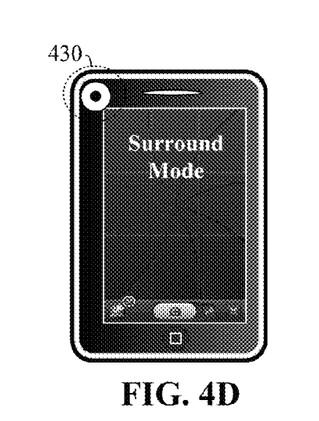
Figure 4E:
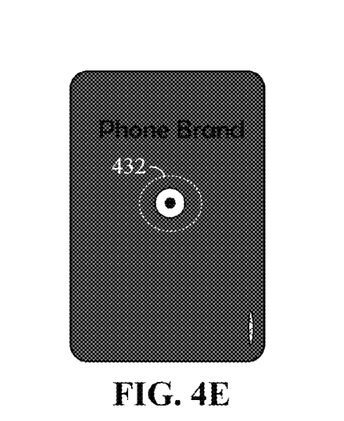

FIGS. 4D and 4E together show imaging components 430 and 432 being positioned in different spatial positions on opposing sides of the mobile device. As shown, a front lens 430 is positioned in an upper left hand side corner and a rear lens 432 is positioned in a central portion of a rear side of the camera. Different placement positions for lenses 430 and 432 are contemplated. Further, multiple different lenses may be added to each side of the mobile device.

Figure 5A:
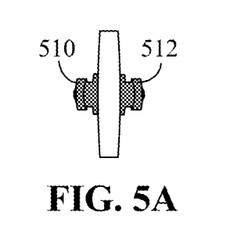
FIG. 5A-5H illustrates different arrangements of lenses for an imaging component.
Figure 5B:
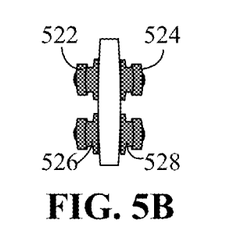
Figure 5C:
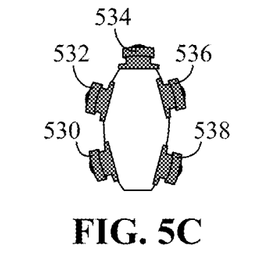
Figure 5D:
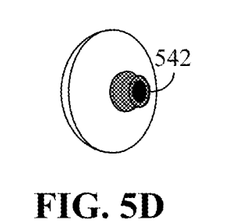
Figures 5E, 5F:
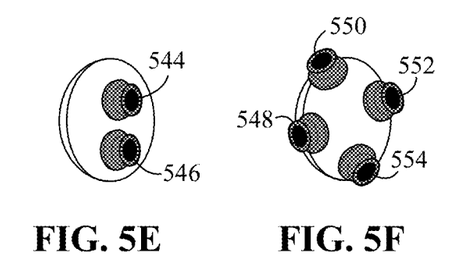
Figure 5G:
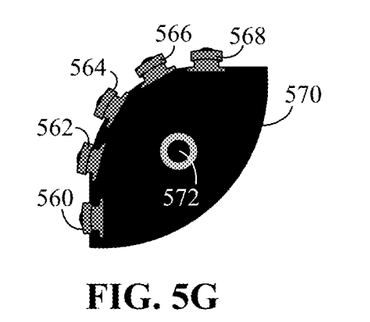
Figure 5H:
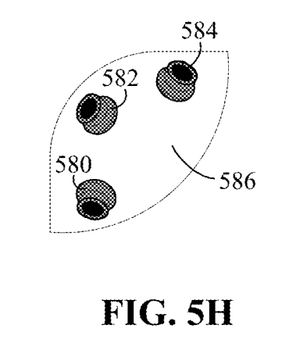

FIG. 5A-5H show different arrangements of lenses for an imaging component 332. It should be appreciated that lenses of 5A-5H can be moveable (e.g., pannable, tiltable, zoomable). In one embodiment, lenses 5A-5H can be fixed lenses mounted on movable segments of a camera. Although the examples in FIG. 5A-5F assume a small optics board having lenses facing in different directions (as suitable for embodiments represented by FIG. 4A-4C), one of ordinary skill can recognize that the shown lens arrangements can also apply for other positions (as suitable for embodiments represented by FIGS. 4D and 4E, for example). FIG. 5G shows a substantially opaque outer casing for a camera imaging component. FIG. 5H shows a substantially transparent outer casing for a camera imaging component.

FIG. 5A-5C show different side views of a dual facing imaging component. In FIG. 4A, one front facing lens 410 faces in an opposing direction to one rear facing lens 412. The lenses may have approximately equivalent or intentionally different imaging characteristics depending on implementation choices.

FIG. 5B shows two different lenses per side of a dual facing imaging component. These different lenses may be useful for different functions, and may have different optical characteristics. For example, one front facing 522 and one rear facing 524 lens may be normal lenses for standard pictures. The additional front facing 526 and rear facing 528 lenses may be ultra-wide lenses, which are able to capture a substantially greater field of view for a surround mode. The ultra-wide lenses may be subject to substantially more distortion than their counterparts 522, 524. Further, images can be captured using both the front facing 522, 526 and/or both the rear-facing 524, 528 lenses, which are able to be processed to achieve image results significantly better than is possible with a single lens alone. That is, the different optical characteristics of the lenses can be synergetic to produce a combined whole greater than either of the discrete parts. Use of two lenses facing in a common direction as shown by FIG. 5B can result in very flexible optics able to serve a gambit of functions.

FIG. 5C shows a series of five 530-538 different lenses, facing different angles about a curved surface of an image component base. The base may be a substrate into which the optical components are directly integrated. The base may also include additional components built on top a substantially flat substrate to produce fixed angles for the various lenses 530-538. As shown, a full overlapping field of view of greater than 270 degrees can be created from the five lenses 530-538. Software/firmware can be used to select which of the lenses 530-538 are to be used for which image capture functions of a mobile device.

FIG. 5D-5F show angled views of different lens arrangements. FIG. 4D represents an imaging component, which has one lens 542 on the shown side. FIG. 4E represents an imaging component having two lenses 544, 546 facing in the same direction. The single lens 542 may be on one side, and two lenses 544, 546 may be on an opposing side of the same imaging component. Alternatively, the image component can have the same number of lens per side (as shown by FIGS. 5A and 5B). Any number of lenses may appear on a single side of an image component, which are positioned in the same or different angles. For example, FIG. 5F shows four different lenses 548-554 on a single side of an image component, which face at different angles relative to a substantially flat plane of that side of the image component. The sides of the image component may form substantially or approximately flat plains, or may be curved depending on implementation choices.

FIGS. 5G and 5H show an outer shell or segment 570 for an imaging component consistent with corner segment 410. In FIG. 5G, a set of lenses 560-568 follow an outer curve of the segment 570. An additional front 572 and/or rear lens may be included in segment 570. The outer shell of FIG. 5G does not permit light to pass through in an optically significant fashion. Thus, either a portion of the lenses 560-568, 572) must physically extrude from the outer shell and/or the lenses 560-568, 572 can be inset into the shell 570 but a small transparent membrane can permit light to pass to the lenses 560-568, 572.

FIG. 5H shows a transparent outer shell for segment 586, which permits light to pass through to be captured by included lenses 580-584. The outer shell may be polarized/un-polarized and may have additional filters, which do not negatively affect an ability of the lenses 580-584 to capture light. A transparent outer shell permits light to pass through a variety of angles, which is highly beneficial for many surround image mode embodiments.

Figure 6A:
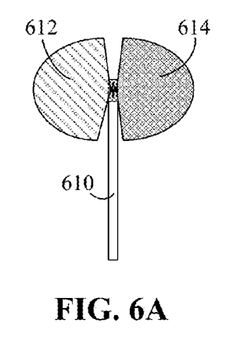
FIG. 6A-6C illustrates an embodiment where two opposing lenses can capture 360 degree images in surround mode.
Figure 6B:
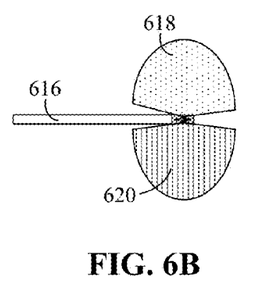
Figure 6C:
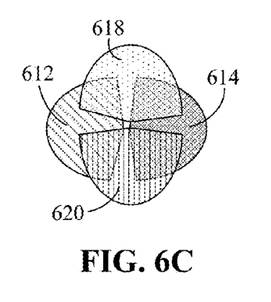

FIG. 6A-6C show an embodiment where two opposing lenses can capture 360 degree images in surround mode. As shown by FIG. 6A, a device positioned in an upward state 610 is able to capture front region 612 using a first facing lens and rear region 614 using a rear facing lense. While still in surround image mode, the device can be tilted sideways so it is in a sideward state 616. When so positioned, the front facing lens can capture region 618 and the rear facing lens can capture region 620. An accelerometer or other sensor (e.g., sensors 340) can detect this movement in one embodiment. Regions 612 and 614 can be captured at substantially a first point in time, and regions 618 and 620 can be captured at substantially a second point in time. The overall captured regions are shown in FIG. 6C, which assumes a stable pivot position of the imaging component. The regions 612-620 as shown in FIG. 6C substantially overlap, so that using images captured at two points in time, a surround region is captured.

Embodiments having manually triggered lenses capable of movement can utilize a similar technique, where a first image is captured when a lens is in a first position (like state 624) and a second image is captured when a lens is in a second position (like state 626). Thus, different regions, which overlap in a surround mode (as shown in FIG. 6C, for example) can result from a mobile device maintained in a relatively stable position, in which image capture lenses move.

Unlike prior art, where a single lens is moved multiple times to join images into a panorama, using multiple lenses facing different directions (even when movement occurs) is less sensitive to motions in a captured scene. For example, a full three sixty degree region is captured using two time-spaced images (FIG. 6C) per the disclosure, where an equivalent using a single lens would require additional movements and image captures. Dynamic objects will likely be moving in a scene during these time periods, which greatly confounds problems with image stitching. Minimizing the movement (by using multiple lenses facing in different directions) either totally eliminates dynamic movement problems (in embodiments where images are captured at a single point in time) or significantly alleviates the problem (when multiple lenses facing different directions take images at two or more times) with dynamic artifacts.

Figure 7:
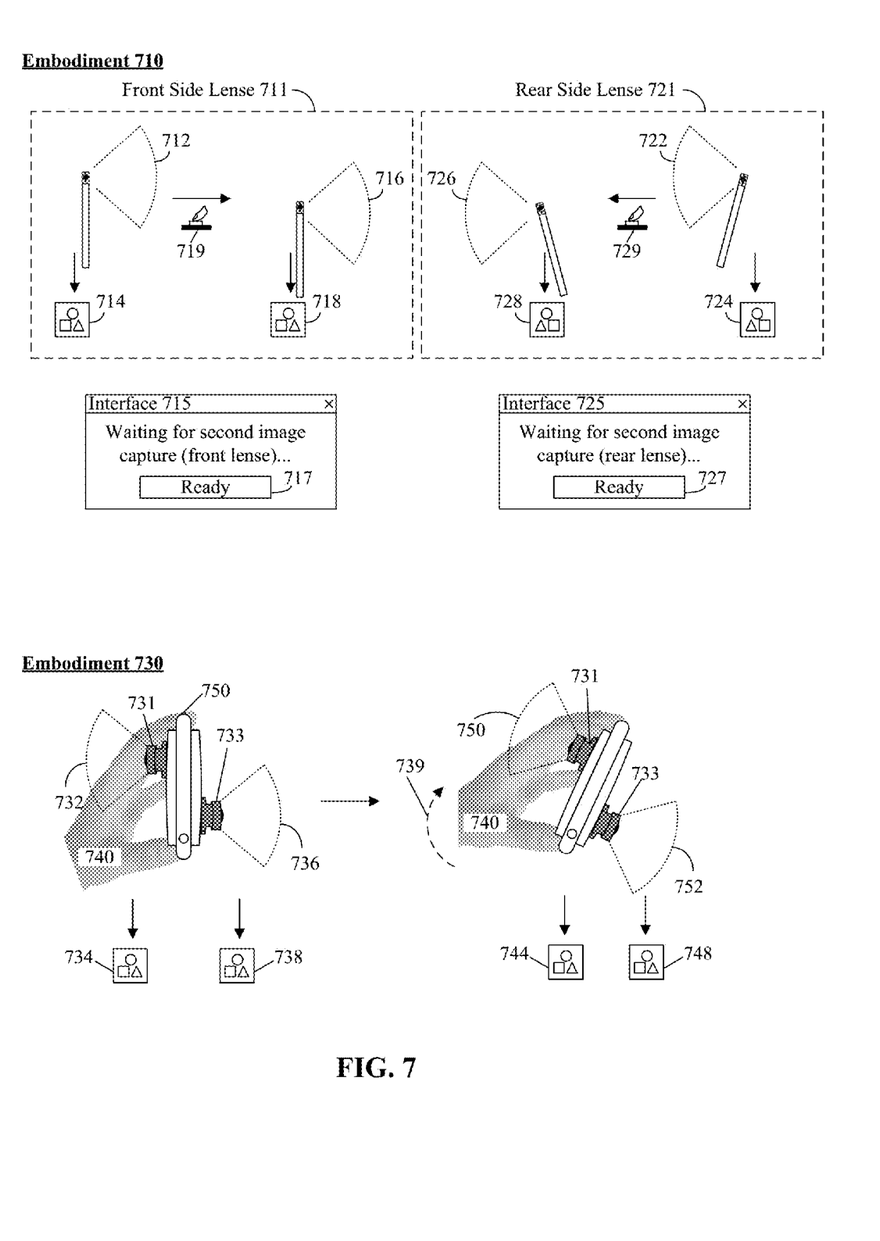
FIG. 7 illustrates a set of embodiments for enabling manually triggered multiple field of view image capture within a surround image mode for multi-lens mobile devices.

FIG. 7 illustrates a set of embodiments for enabling multiple field of view image capture within a surround image mode for multi-lens mobile devices.

In embodiment 710, a front-side lens 711 and a rear-side lens 721 can be integrated within an electronic device (e.g., camera, smart phone). In the embodiment 710, a front-side lens 711 can capture an image 714 and a subsequent image 718. For example, lens 711 can record an image 714 and can be manually triggered responsive to a user operation 719 (e.g., pan/tilt/zoom) to capture a subsequent image 718. Image 714, 718 can include a field of view (FoV) 712, 716 of approximately 180 degrees. In one instance, FoV 712, 716 can overlap resulting in two images 714, 718 with overlapping fields of view. In the instance, an image stitching algorithm can stitch the images 714, 718 into a panoramic image (e.g., 180 degree panoramic). In the embodiment 710, a rear-side lens 721 can capture an image 724 and a subsequent image 728. For example, lens 721 can record an image 724 and can be manually triggered responsive to a user operation 729 (e.g., pan/tilt/zoom) to capture a subsequent image 728. Image 724,728 can include a field of view (FoV) 722, 726 of approximately 180 degrees. In one instance, FoV 722, 726 can overlap resulting in two images 724, 728 with overlapping fields of view. In the instance, an image stitching algorithm can stitch the images 724, 728 into a panoramic image (e.g., 180 degree panoramic). In one instance, images 714, 718, 724, 728 can be stitched together to form a 360 degree panoramic.

In one instance, the embodiment 710 can be a stepwise process which can be triggered responsive to an image capture functionality. In the instance, the lens 711 can capture a first image (e.g., FoV 712) and capture a second image (e.g., 716) when the user manually pans the lens 711. In one configuration, an interface 715, 725 can enable this multiple field of view capture process. In the configuration, interface can permit subsequent image capture via selection of interface element 717, 727. For example, when a user selects "Ready" after zooming the lens out and creating a larger field of view than the first image, a subsequent image (with the different field of view) can be captured.

In embodiment 730, a front-side lens 731 and a rear-side lens 733 can be integrated within an electronic device (e.g., camera 750, smart phone). In the embodiment, the front-side lens 731 can capture a field of view 732 while a rear-side lens 733 can capture an opposing field of view 736. The lens 731 can capture an image 734 with a corresponding field of view 734 and lens 733 can capture an image 738 with a corresponding field of view 738. In one embodiment, the camera 750 can be repositioned 739 (e.g., twisted) by a user's hand 740 resulting in a different field of view 750, 752 being captured by lens 731, 733. For example, a user can twist camera 750 after a surround mode functionality is activated and image capture 734, 738 is performed. In one instance, movement 739 can be detected automatically triggering each lens to capture an image 744, 748. That is, the lens 731 can capture an image 742 with a corresponding field of view 750 and lens 733 can capture an image 748 with a corresponding field of view 752. In one configuration of embodiment 730, image 744, 748 capture can be manually triggered by a user (e.g., shutter release). In the instance, an image stitching algorithm can stitch the images 734, 738 into a panoramic image (e.g., 180 degree panoramic). In one instance, images 734, 738, 744, 7648 can be stitched together to form a 360 degree panoramic.

It should be appreciated that the manual triggering described herein can include a manual pan action, a manual tilt action, a manual zoom action. It should be appreciated that triggering can be synchronized for front and rear side lense. That is, movement of either front or rear side lens can trigger the movement of the other. In one embodiment, the lens 711, 721, 731, 733 can capture three images each with fields of view of 60 degrees or more. In the embodiment, the images can be stitched together to form a 180 degree panorama for each side (e.g., front and rear). It should be appreciated that image field of view can include overlap which can be utilized to aid stitching operations.

It should be appreciated that field of view 712, 716, 722, 726 can be non-uniform. For example, field of view 712 can be a 25 degree field of view and field of view 716 can be a 90 degree field of view.

Figure 8A:
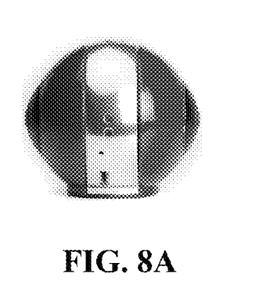
FIGS. 8A-E illustrates a set of embodiments for enabling manually triggered multiple field of view image capture within a surround image mode for multi-lens mobile devices.
Figure 8B:
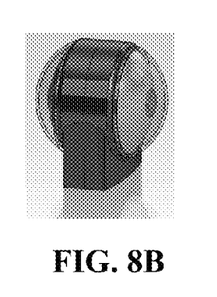
Figure 8C:
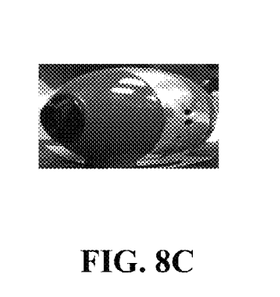

As shown by FIG. 8A-C, an outer surface of a body or casing of the panoramic optical device may have a set of parallel cross sectional planes (orthogonal to a facing direction of the lenses), which are substantially circular or elliptical. The radius or diameter of these cross sectional planes can be greatest at approximately a body midpoint (between the lenses) can decrease towards the lenses.

Figure 8D:
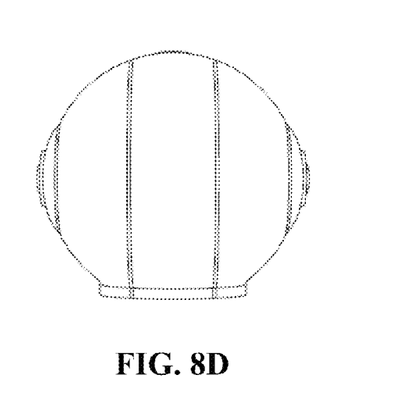

FIG. 8D is a perspective view of the panoramic optical device showing a spherical arrangement with two opposing facing lenses.

Figure 8E:
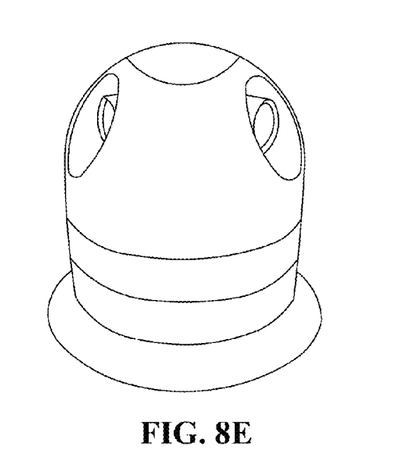

FIG. 8E is a perspective view of the panoramic optical device showing a modular camera arrangement with two opposing facing lenses.

An overall shape of the outer surface or body of the casing can be described in many ways using solid geometry conventions, where the shape may depend on a specific embodiment. For example, the overall shape can be that of a non-degenerate closed quadric surface having curved and opposing end points. In contemplated embodiments, the overall shape can be that of a capsule (e.g., an ideal or mathematically defined capsule). The overall shape can further be that of a sphere or an ellipsoid. When noting the overall shape, some deviations from an ideal shape (mathematically) are expected for reasons of functionality (of the optical characteristics) for manufacturing efficiency, for challenges with electronic component placement, and for aesthetic reasons. For example, a slight offset from a mathematically defined outer shape can exist at a join between a center portion (of a three part sectional body) to either make it easier to join the sections, or to provide greater interior space for placing circuit boards, a battery, a processor, or other components. For quantification purposes, some standard deviations from an overall shape, as defined herein, are within a ten percent deviation by surface area of an idealized shape, within a five percent deviation of a cross sectional idealized curvature, and the like. These deviations are consistent with industry standards and expectations of those of ordinary skill in the art in context of device design.

The flowchart and block diagrams in the FIG. 1A-8 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for implementing image capture from a mobile phone comprising:

receiving a user activation of an image capture function of a mobile device, wherein the image capture function is for a surround image mode;

responsive to the user activation, approximately concurrently activating two camera lenses, which comprise a front-side and a rear-side camera lens of the mobile device, wherein the front-side and the rear-side camera lenses are interior components deposed between a front and a back side of the mobile device, wherein the front-side and the rear-side camera lenses each have a field of view between ninety and one hundred and eighty degrees while at least one of the front-side and rear-side camera lenses has a field of view less than one hundred and eighty degrees, wherein coverage of the front-side and the rear-side camera lenses is non-overlapping when concurrently activated, wherein a region of a 360 degree arc about the mobile device remains uncovered by either the front-side and the rear-side camera lenses when concurrently activated;

responsive to the user activation, optically capturing a first front-side image using the front-side camera lens and a first rear-side image using the rear-side camera lens, wherein creation of the first front-side image and of the first rear-side image occurs concurrently;

while still in the surround image mode and while still performing the image capture function waiting a delay period from a time at which the first front-side image and the first rear-side image was created, during which a user manually repositions the mobile device to align the front-side and rear-side camera lenses to cover the region of the 360 degree arc initially not covered;

after the delay period once the mobile device has been manually repositioned continuing the image capture function by capturing a second front-side image using the front-side lens and a second rear-side image using the rear-side lens, wherein creation of the second front-side image and the second rear-side image occurs concurrently;

while still performing the image capture function, combining content from the first front-side image, the second front-side image, the first rear side image, and the second rear side image to create a single file that is a three hundred and sixty degree panoramic image also referred to as a surround image that optically covers the region of the 360 degree arc about the mobile device; and recording, as part of the image capture function, in a non-transitory storage medium of the mobile device, the single file.

2. The method of claim 1, wherein the mobile device is a phone.

3. The method of claim 1, wherein the single file has a panoramic image format.

4. The method of claim 1, wherein the front-side and the rear-side camera lenses are ultra wide angle lenses, each having angles of view between one hundred and fifty degrees and one hundred and eighty degrees, wherein raw content captured by the front-side and the rear-side camera lenses are hemispherical images.

5. The method of claim 1, further comprising:

a processor within the mobile device stitching content from the first front-side image, the second front-side image, the first rear-side image, and the second rear-side image together to create a substantially continuous image as the surround image.

6. The method of claim 1, further comprising:

capturing the first front-side image at a first focus point within a focal plane;

capturing a the second front-side image at a second focus point within the focal plane, wherein the first and second focus points are different.

7. The method of claim 1, wherein the mobile device comprises at third camera lens positioned approximately orthogonally to the front-side lens and to the rear-side lens.

8. The method of claim 1, wherein the front-side and the rear-side camera lenses are fixed lenses, wherein the mobile device comprises at least one sensor for detecting movement of the mobile device.

9. A mobile device comprising:

two or more camera lenses, which comprise a front-side and a rear-side camera lens of the mobile device, wherein the front-side and the rear-side camera lenses are interior components deposed between a front and a back side of the mobile device, wherein the front-side and the rear-side camera lenses each have a field of view between ninety and one hundred and eighty degrees while at least one of the front-side and rear-side camera lenses has a field of view less than one hundred and eighty degrees, wherein coverage of the front-side and the rear-side camera lenses is non-overlapping when concurrently activated, wherein a region of a 360 degree arc about the mobile device remains uncovered by either the front-side and the rear-side camera lenses when concurrently activated;

a non-transitory storage medium; and one or more processors executing program instructions to:

receive a user activation of an image capture function of the mobile device, wherein the image capture function is for a surround image mode;

responsive to the user activation, approximately concurrently activate the front-side and the rear-side camera lenses;

responsive to the user activation, optically capture a first front-side image using the front-side camera lens and a first rear-side image using the rear-side camera lens, wherein creation of the first front-side image and of the first rear-side image occurs concurrently;

while still in the surround image mode and while still performing the image capture function wait a delay period from a time at which the first front-side image and the first rear-side image was created, during which a user manually repositions the mobile device to align the front-side and rear-side camera lenses to cover the region of the 360 degree arc initially not covered;

after the delay period once the mobile device has been manually repositioned continuing the image capture function by capture a second front-side image using the front-side lens and a second rear-side image using the rear-side lens, wherein creation of the second front-side image and the second rear-side image occurs concurrently, while still performing the image capture function, combine content from the first front-side image, the second front-side image, the first rear side image, and the second rear side image to create a single file that is a three hundred and sixty degree panoramic image also referred to as a surround image that optically covers the region of the 360 degree arc about the mobile device; and record, as part of the image capture function, in a non-transitory storage medium of the mobile device, the single file.

10. The mobile device of claim 9, wherein the mobile device is a phone.

11. The mobile device of claim 9, wherein mobile device comprises a removable section, wherein the removable section comprises imaging components comprising the front-side and the rear-side camera lenses, wherein different user pluggable removable sections enable different optical characteristics to be selectively enabled for the mobile device.

12. The mobile device of claim 9, wherein the mobile device comprises a third camera lens, which is a side facing lens positioned approximately orthogonally to the front-side and the rear-side lenses.

13. The mobile device of claim 9, wherein the mobile device comprises a corner section that is optically transparent, wherein the corner section comprises imaging components for the mobile device, wherein the image components comprise the front-side and the rear-side camera lenses.

14. The mobile device of claim 9, wherein in addition to the front-side and the rear-side camera lenses, the mobile device comprises a rear-facing ultra-wide angle lens and a front-facing ultra wide angle lens.

15. A computer program product comprising a non-transitory computer readable storage medium having computer usable program code embodied therewith, the computer usable program code comprising:

computer usable program code of a non-transitory storage medium configured to:

receive a user activation of an image capture function of the mobile device, wherein the image capture function is for a surround image mode, wherein the mobile device comprises a front-side and a rear-side camera lens of the mobile device, wherein the front-side and the rear-side camera lenses are interior components deposed between a front and a back side of the mobile device, wherein the front-side and the rear-side camera lenses each have a field of view between ninety and one hundred and eighty degrees while at least one of the front-side and rear-side camera lenses has a field of view less than one hundred and eighty degrees, wherein coverage of the front-side and the rear-side camera lenses is non-overlapping when concurrently activated, wherein a region of a 360 degree arc about the mobile device remains uncovered by either the front-side and the rear-side camera lenses when concurrently activated;

responsive to the user activation, approximately concurrently activate the front-side and the rear-side camera lenses;

responsive to the user activation, optically capture a first front-side image using the front-side camera lens and a first rear-side image using the rear-side camera lens, wherein creation of the first front-side image and of the first rear-side image occurs concurrently;

while still in the surround image mode and while still performing the image capture function wait a delay period from a time at which the first front-side image and the first rear-side image was created, during which a user manually repositions the mobile device to align the front-side and rear-side camera lenses to cover the region of the 360 degree arc initially not covered;

after the delay period once the mobile device has been manually repositioned continuing the image capture function by capture a second front-side image using the front-side lens and a second rear-side image using the rear-side lens, wherein creation of the second front-side image and the second rear-side image occurs concurrently, while still performing the image capture function, combine content from the first front-side image, the second front-side image, the first rear side image, and the second rear side image to create a single file that is a three and sixty hundred degree panoramic image also referred to as a surround image that optically covers the region of the 360 degree arc about the mobile device; and record, as part of the image capture function, in a non-transitory storage medium of the mobile device, the single file.

16. The computer program product of claim 15, wherein the mobile device is a phone.

\* \* \* \* \*